April 8, 1969   J. L. DAILEY   3,437,951
MODULATING OR Q-SWITCHING A LASER
Filed May 28, 1965
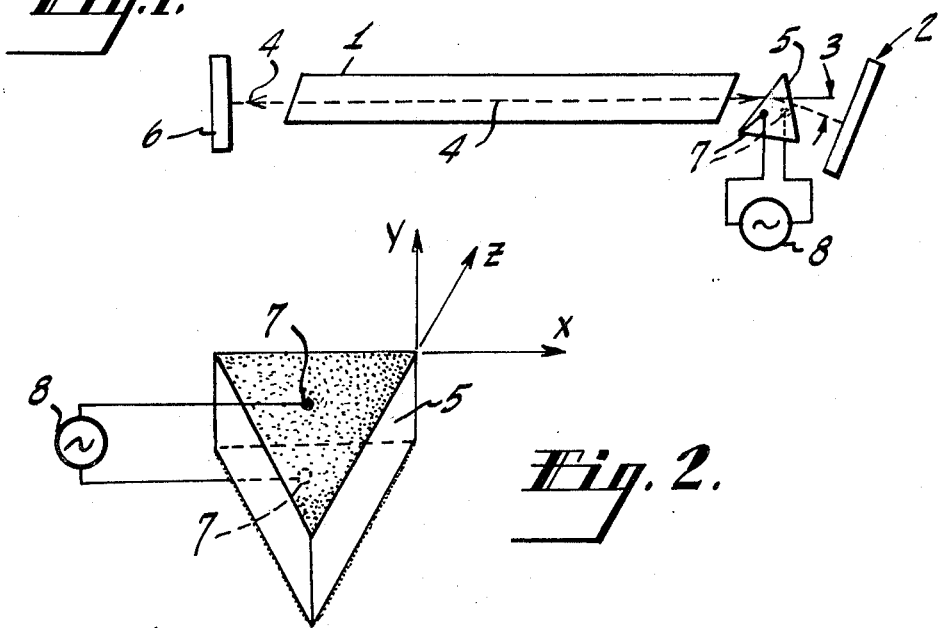
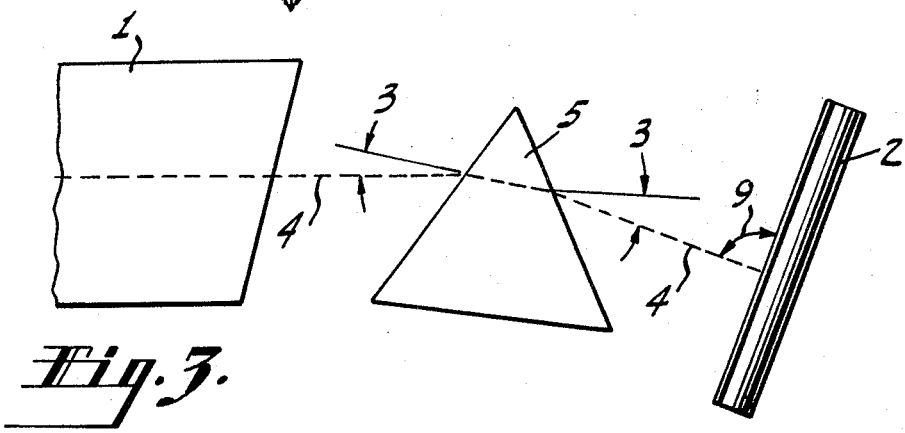
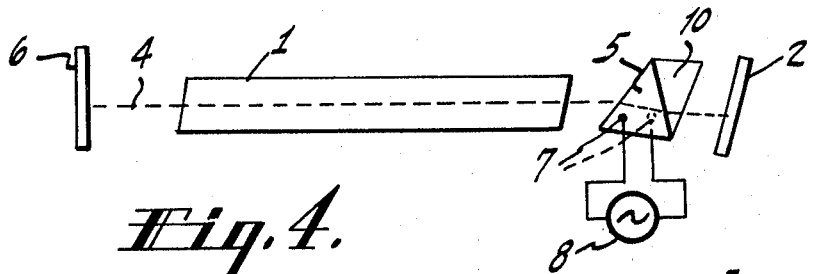
INVENTOR.
JOHN L. DAILEY
BY Edward J. Norton
Attorney United States Patent Office 3,437,951
Patented Apr. 8, 1969

3,437,951
MODULATING OR Q-SWITCHING A LASER
John L. Dailey, West Berlin, N.J., assignor to Radio Corporation of America, a corporation of Delaware
Filed May 28, 1965, Ser. No. 459,557
Int. Cl. H01s 3/00; G02f 1/26, 1/28
U.S. Cl. 331—94.5                               4 Claims

ABSTRACT OF THE DISCLOSURE

A laser is modulated or Q-switched by inserting within the optical cavity a prism of material having transverse electro-optic characteristics. The prism is positioned between the laser material and a second of two reflectors defining the optical cavity, which second reflector is positioned at an oblique angle with respect to a first of these two reflectors. The prism is shaped and oriented such that in the absence of a given electric field controlled by an external signal the beam is refracted through the prism at that specified angle which results in the beam being incident at a normal angle to the second reflector's surface. In the presence of the given electric field, the beam is refracted at an angle deviating from the specified angle by an amount determined by the external signal. In a more specific embodiment of the invention, a second prism is utilized which magnifies any deviation from the specified angle provided by the electro-optic prism.

This invention relates to lasers and more particularly to an improved apparatus for modulating or Q-switching a laser.

Under the prior art, the modulation of laser beams has been accomplished by various methods. One method makes use of the fact that if linearly polarized light is incident upon a crystal having electro-optic characteristics, then the light emerging from the crystal is elliptically polarized. The degree of ellipticity can be made the function of a modulating voltage applied across the crystal. The elliptically polarized light is passed through a linear polarizer. The intensity of the light passing through the polarizer will vary in proportion to the modulating voltage as the ellipticity is changed. Such modulators or intensity varying devices using this principle require polarizers and high voltage fields to produce the desired results. Such modulators are usually used external to the laser itself.

In general, prior art electrical means of modulating lasers require high fields and hence high power. There are, of course, mechanical devices which are capable of modulating a light beam such as shutter type devices, rotating or oscillating mirrors, etc. Mechanical type modulators thend to be bulky and require precise and costly machining processes for proper fabrication.

Accordingly, it is an object of this invention to provide an improved system and apparatus for electronically varying the intensity of a laser with a great reduction in the required field strength as compared to systems previously available.

It is another object of the present invention to provide an improved laser modulator requiring relatively low power to accomplish modulation.

It is another object to provide an improved system and apparatus for varying laser intensity internal to the laser cavity.

It is a further object to provide an improved system and apparatus to vary the intensity of a laser without the use of polarizers or filters.

Still another object is to provide an improved system and apparatus to vary the intensity of a laser without the use of mechanical moving parts.

These and other objects of the invention are achieved by providing a cavity capable of supporting optical energy at specific frequencies. An active laser material is placed within the cavity, such material being capable of stimulated emission at said specific frequencies. The cavity is preferably defined by a plurality of reflecting surfaces. An element having electro-optic characteristics is positioned within the cavity. The electro-optic element and reflectors are so positioned that the direction of travel of the optical energy within the cavity is a function of the field impressed on the element and controlled by an external signal. Moreover, the cavity is so arranged that the intensity of the output beam is a function of the direction of travel of the energy within the cavity. Thus, by varying the direction of travel with an external signal the intensity of the output beam is varied.

The operation of this device will become clearer if reference is made to the following drawing of which:

FIGURE 1 is a diagram of one embodiment of a laser apparatus as contemplated by this invention.

FIGURE 2 is a pictorial representation showing the shape of an element of the FIG. 1 embodiment having electro-optic characteristics.

FIGURE 3 is an enlarged diagram of the right half of FIGURE 1 showing some angular designations.

FIGURE 4 is a diagram of another embodiment of a laser apparatus as contemplated by this invention.

Referring to FIGURE 1, reference numeral 1 represents the body of and structure normally associated with a lasing material which may be a gas, liquid, or solid. It is assumed that the reference numeral 1 further includes suitable means for causing the lasing material to laze in a manner to produce a beam 4. Such means, not shown, can take any known form according to the lasing material used and other requirements. A reflector 2 is positioned with its normal displaced by an angle 3 from the direction of the beam 4 in said lasing material 1. A prism 5 possessing transverse electro-optic characteristics is set between the reflector 2 and the body of the lasing material 1 such that it induces a deviation in the beam 4 equal to the above mentioned angle 3 in the absence of any field applied across the prism 5. With no field applied, the beam 4 which is reflected perpendicularly from the reflector 6, strikes the reflector 2 at normal incidence. The two reflectors 2 and 6 define a cavity capable of supporting optical energy at the laser emission frequency of the active material 1. In the absence of an applied field the Q of the cavity is very high and laser action can occur. Laser action occurs as the beam 4 strikes the surface of the reflector 2 and is reflected back through the element 5. The beam 4 passes through and excites the laser material 1 and is reflected back through the system again by the reflector 6 located at the opposite end.

Referring now to FIGURE 2, there is shown an example of a prism-like element 5 which can be used in the embodiment of FIG. 1. The element 5 has electro-optic characteristics and is cut or shaped with the axes X, Y, Z as labeled in FIG. 2 parallel to the acute edges of prism 5. The element 5 can be fabricated from a material having electro-optic characteristics such as hexamine, potassium dihydrogen phosphate (KDP), cuprous chloride (CuCl), ammonium dihydrogen phosphate (ADP), etc. The reference numeral 7 in FIGURE 2 represents electrodes which are placed on the triangular faces of the prism 5. Such electrodes 7 can be placed on the triangular surfaces by conventional means, such as deposition of a layer of tin oxide or another suitable material and making electrical contact to said material.

It can be shown that for a beam of light (4 in FIG. 1), which is plane polarized parallel to the prism surfaces upon which the electrodes 7 are connected, the index of refraction of the prism 5 is:

(1) $\qquad n = n_0 \pm \frac{1}{2} n_0^3 r_{63} E_z$ where $n_0$ is the index of refraction with zero applied field,
$r_{63}$ is the electro-optic modulus or Pockel's constant,
$E_z$ is the field in volts/cm. along the $z$ axis, and
$n$ is the resultant index of refraction.

The above equation holds for a prism or element constructed of potassium dihydrogen phosphate (KDP) or its isomorphs. For other materials the equation takes on the general form and may be represented by (2) $\qquad n = n_0 \pm K r_{1j} E_w$ where $n$ is the resultant index of refraction,
$r_{1j}$ is the electro-optic modulus or Pockel's constant for the material,
$K$ is a constant for the material which may include a term consisting of a constant relation where $n_0$ is part of the term,
$n_0$ is the index of refraction with zero applied field, and
$E_w$ is the field in volts/cm. along an axis of the element.

If the prism 5 is set within the laser as shown in FIGURE 1, the system will lase when the prism 5 bends or varies the beam 4 so that the beam 4 emerges from the element 5 perpendicular to the reflecting surface of the reflector 2. This angle is designated by reference numeral 9 in FIGURE 3. The laser will lase if angle 9 is kept within about two seconds deviation from the normal to the reflector's 2 surface. The angle designated by numeral 3 shown in FIGS. 1 and 3 should be Brewster's angle to minimize reflection loss.

If a field is impressed across the prism 5 by a source 8, shown in FIG. 1, the index of refraction $n$ of the prism varies according to the Equation 1. The variation of the index of refraction produces a deviation in the angle 3 and such deviation is amplified as the beam 4 is caused to make repeated passes through the prism 5 because it is reflected back and forth by the reflectors 2 and 6 of FIGURE 1. A typical gas laser will shut down when the beam moves an angle of 2 seconds from the reflector's normal; and the energy of the beam 4 will drop to half power at 1 second of deviation in the angle 3. For other laser devices such as those consisting of solids or liquids, the angle deviation needed to shut down the laser or reduce its power may be different, but the technique described will be applicable as the technique is general and serves to deflect the angle regardless of the type of lasing material used. Hence, it can be seen that the application of a field on the prism 5 can cause the beam 4 to shut off or reduce its energy. The reduction in energy causes an intensity variation which is then proportional to the field applied from the source 8. The use of the field from the source 8 applied to the element 5 in this manner affords a negligible dissipation of power in the element 5 as compared to the conventional method because only a very small voltage is required to induce a two second deviation. Typically less than twenty-five volts is sufficient.

If reference is made to FIG. 4, there is shown another element 10, mounted adjacent to the prism 5. Such an element 10 is used as an optical lever i.e., the element 10 amplifies any angular deviations induced by the prism 5. The element 10 can be of the type constructed from a material that changes its index of refraction according to the angle of incidence of the beam of light 4 upon its surface. Such materials as calcite, which have uniaxial properties can be utilized for element 10. With addition of the element 10, an electrically induced deviation caused by the field 8 acting on the element 5 may be increased or amplified. This would require even less voltage or power from the external field 8 acting upon the element 5.

For greater deviation with less voltage the element 10 can be stacked as can the elements 5.

It should be evident from the various illustrative embodiments that have been set forth that the principles of the invention can be utilized in a wide variety of forms. Accordingly, it is to be understood that the arrangements and shapes merely illustrate the general principles of the invention.

Various other arrangements can be devised by one skilled in the electronics art without departing from one spirit and scope of the invention.

What is claimed is:
1. In combination:
   (a) a cavity defined by a plurality of reflectors such that said cavity is capable of supporting a beam of optical energy at specific frequencies,
   (b) an active laser material capable of stimulated emission at said specific frequencies positioned within said cavity such that the energy supported by said cavity is amplified by said material to the extent necessary to sustain oscillations at said frequencies,
   (c) first elements of a material having electro-optic characteristics positioned within said cavity such that said beam passes through said elements,
   (d) second elements of a material having variable characteristics, such that as said beam enters said second elements the index of refraction of said elements is a function of the angle of incidence of said beam, said second elements being positioned within said cavity such that said beam passes through said second elements,
   (e) means for applying an electric field controlled by an external signal to said first elements to change the position and direction of said beam according to said signal,
   (f) said second elements being positioned such that said second eelments amplify the change in direction and position of said beam caused by the operation of said field on said first elements,
   (g) the position and direction of said beam being so changed such that said beam upon impinging on certain of said reflectors is reflected back through said first and second elements in a manner to cause the beam to impinge on said other reflectors which in turn reflect said beam back through said first and second elements until said beam is so changed in direction and position as to alter said beam's energy and thereby its intensity.

2. In combination:
   (a) an active laser material capable of stimulated emission at said specific frequencies,
   (b) a first reflector located at a specified distance from one end of said laser material, a second reflector located at a specified distance from the opposite end of said laser material and positioned at an angle to said first reflector, said first and second reflecting surfaces facing said laser material,
   (c) prisms of material having transverse electro-optic characteristics positioned between said laser material and one of said reflectors such that said beam passes through said prism and is deflected at a specified angle to said second reflector's surface,
   (d) second prisms of material having variable characteristics, such that the index of refraction is a function of the angle of incidence of said beams, positioned such that said beam passes through said prisms having variable characteristics and is deflected at another specified angle to said second reflector's surface, and
   (e) means for applying an electric field controlled by an external signal to said prism having electro-optic characteristics to cause said beam to be deflected at an angle deviating from said specified angles so that said beam impinges on said second reflector's surface at an angle determined by said signal and is reflected by said second reflector back through said first and said second prisms, said back reflected beam being further deflected by said prisms and thereafter impinging on said first reflector from which said beam is again reflected through said prisms onto said second reflector's surface, whereby said deflection of said beam as it passes between said reflectors through said prisms varies according to said signal the energy and intensity of said beam.

3. The combination as claimed in claim 2 wherein said prism having electro-optic characteristics is fabricated from potassium dihydrogen phosphate (KDP).

4. The combination as claimed in claim 2 wherein said prism having variable characteristics is fabricated from calcite.

References Cited
UNITED STATES PATENTS

| | | | |
|---|---|---|---|
| 3,243,724 | 3/1966 | Vnylsteke | 331—94.5 |
| 3,290,619 | 12/1966 | Geusic et al. | 350—150 |
| 3,297,876 | 1/1967 | De Maria | 331—94.5 |

JEWELL H. PEDERSEN, *Primary Examiner.*

W. L. SIKES, *Assistant Examiner.*

U.S. Cl. X.R.

350—150, 160, 168